US012639267B2

(12) United States Patent
Galazka et al.

(10) Patent No.: US 12,639,267 B2
(45) **Date of Patent: \*May 26, 2026**

(54) SYSTEMS AND METHODS FOR AUTOMATED AUDIT ARTIFACT RECONCILIATION

(71) Applicant: Protiviti Inc., Menlo Park, CA (US)

(72) Inventors: Andrew Vechey Galazka, Deerfield Beach, FL (US); John Taylor Stirling, Davie, FL (US); Kevin Ross Stuart, Orlando, FL (US); Jeremy Ryan Wildhaber, Edwardsville, IL (US)

(73) Assignee: Protiviti Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/813,826

(22) Filed: Aug. 23, 2024

(65) Prior Publication Data

US 2024/0419637 A1    Dec. 19, 2024

Related U.S. Application Data

(63) Continuation of application No. 17/875,184, filed on Jul. 27, 2022, now Pat. No. 12,099,474.

(60) Provisional application No. 63/338,362, filed on May 4, 2022.

(51) Int. Cl.
*G06F 16/17* (2019.01)
*G06F 16/14* (2019.01)
*G06F 16/174* (2019.01)

(52) U.S. Cl.
CPC ........ *G06F 16/1744* (2019.01); *G06F 16/148* (2019.01)

(58) Field of Classification Search
CPC ....... G06F 16/174; G06F 16/14; G06F 16/215
See application file for complete search history.

(56) References Cited

U.S. PATENT DOCUMENTS

| | | | |
|---|---|---|---|
| 10,943,196 B2 | 3/2021 | Li et al. | |
| 2005/0071194 A1* | 3/2005 | Bormann | .............. G16H 10/60 |
| | | | 705/2 |
| 2009/0157689 A1 | 6/2009 | Hotz | |
| 2018/0060954 A1 | 3/2018 | Yin et al. | |
| 2020/0097567 A1* | 3/2020 | Jaswal | ................. G06F 3/0601 |
| 2020/0286056 A1* | 9/2020 | Martino | ................ G06N 20/00 |
| 2020/0311326 A1* | 10/2020 | Kochar | ................. G06F 30/27 |
| 2020/0358859 A1* | 11/2020 | Gupta | ................. H04L 67/148 |
| 2023/0291731 A1 | 9/2023 | O'Neill et al. | |

OTHER PUBLICATIONS

Non-Final Office Action on U.S. Appl. No. 17/875,184 dated Jan. 31, 2024.
Notice of Allowance on U.S. Appl. No. 17/875,184 dated Jun. 18, 2024.

\* cited by examiner

*Primary Examiner* — Maher N Algibhah
(74) *Attorney, Agent, or Firm* — Foley & Lardner LLP

(57) ABSTRACT

The present solution provides systems and methods to receive an artifact, cause the artifact to be compared with many data structures such as files, based on the types of the data structures, determining a similarity between the artifact and elements of the data structures, comparing the similarity to one or more confidence intervals, and storing an output file containing one or more similar elements.

19 Claims, 12 Drawing Sheets

360

362 Tokenize fuzzy match fields into vectors

364 Perform fuzzy match for selected column

366 Find best match result

368 Append columns for each related data field

371 First Run?

Yes → 372A Import Results to Testing Template

No → 372B Append Results to Existing Testing Template

374 Invoke Script

End

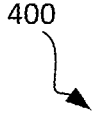

400

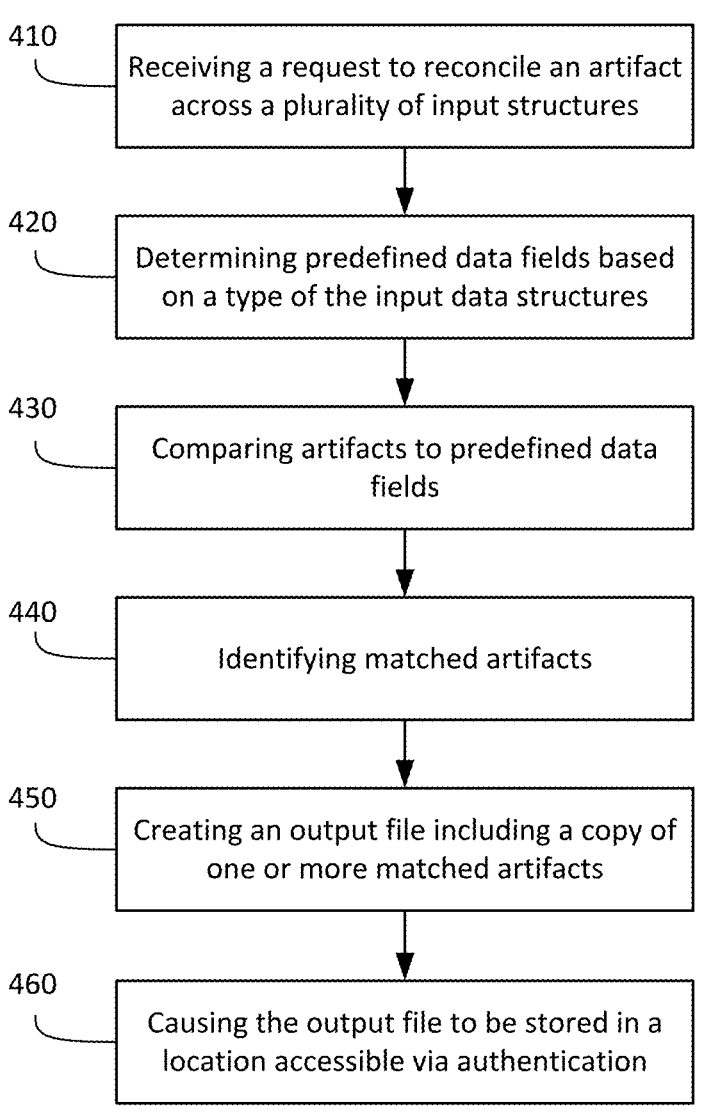

410 Receiving a request to reconcile an artifact across a plurality of input structures 420 Determining predefined data fields based on a type of the input data structures 430 Comparing artifacts to predefined data fields 440 Identifying matched artifacts 450 Creating an output file including a copy of one or more matched artifacts 460 Causing the output file to be stored in a location accessible via authentication

*FIG. 4*

SYSTEMS AND METHODS FOR AUTOMATED AUDIT ARTIFACT RECONCILIATION

CROSS-REFERENCE TO RELATED APPLICATION

This patent application is a continuation of, and claims priority to and the benefit of U.S. patent application Ser. No. 17/875,184, titled "SYSTEMS AND METHODS FOR AUTOMATED AUDIT ARTIFACT RECONCILIATION," and filed Jul. 27, 2022, which claims the benefit of and priority to U.S. Provisional Patent Application 63/338,362, titled "SYSTEMS AND METHODS FOR AUTOMATED AUDIT ARTIFACT RECONCILIATION," and filed May 4, 2022, the contents of all of which are hereby incorporated herein by reference in its entirety for all purposes.

FIELD OF THE DISCLOSURE

This disclosure generally relates to systems and methods for automated audit artifacts reconciliation.

BACKGROUND OF THE DISCLOSURE

Modern organizations may rely on a variety of applications to perform work throughout an enterprise. Each of these applications may include distinct identification and/or credentialing schemes. The various schemes may render it difficult to generate enterprise-wide information relating to an entity. Further, some identification schemes may rely, directly or indirectly, on manual entry of data, which may further disharmonize various identifiers.

Business, regulatory, or administrative tasks may require consolidating actions associated with an entity across an organization. If the entity is associated with multiple distinct identifiers, which may be further subject to errors associated with manual entry and other vectors for non-uniformity, it may be challenging to reconcile an entity with a known or unknown number of identifiers. Further improvements are needed to advance the state of the art.

BRIEF SUMMARY OF THE DISCLOSURE

The present disclosure provides systems and methods for automated audit artifact reconciliation. An artifact such as an identifier may be provided to a data processing system, which may thereafter locate, associate, and compare the artifact with a plurality of data structures in order to reconcile the data structures or a portion thereof with the artifact. For example, the data structures may comprise a plurality of files associated with various identifiers used to access a systems, such as enterprise databases. Advantageously, the reconciliation between the artifact and the plurality of databases may enable a user to reconcile an identifier with a number of related identifiers user to access various systems, even where those identifiers may include errors, or be otherwise dissimilar. Advantageously, such systems and methods may represent an improvement to traditional matching of users between systems, such as by global identifiers, because the association may be made between systems which are not controlled by global identifiers, may identify users despite various dissimilarities, and may identify potential close matches, which may otherwise lead to additional failures to reconcile an artifact with various related data.

In one aspect, this disclosure is directed to a method of automated audit artifact reconciliation. The method includes receiving a request from a user to reconcile one or more artifacts across a plurality of input data structures within a confidence threshold, determining a type of each of the input data structures and that each of the input data structures predetermined data fields for the artifacts based on the type, comparing an artifact of the data fields of an input data structure against another artifact of the data fields of each of the other input data structures. The method also includes identifying based on the comparison, matches of the artifact of the input data structure with the other artifact of the other input data structures having a match score exceeding the confidence threshold, creating an output file to include the input data structure and a copy of the matches of the other artifacts from the other input data structures with a match; and causing storage of the output file in a location accessible by the user via authentication. The method may be performed by a data processing system.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4 is a flowchart of an example method of reconciling artifacts, in accordance with some embodiments.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for automated audit artifact reconciliation.

A. Computing and Network Environment

Figure 1A:
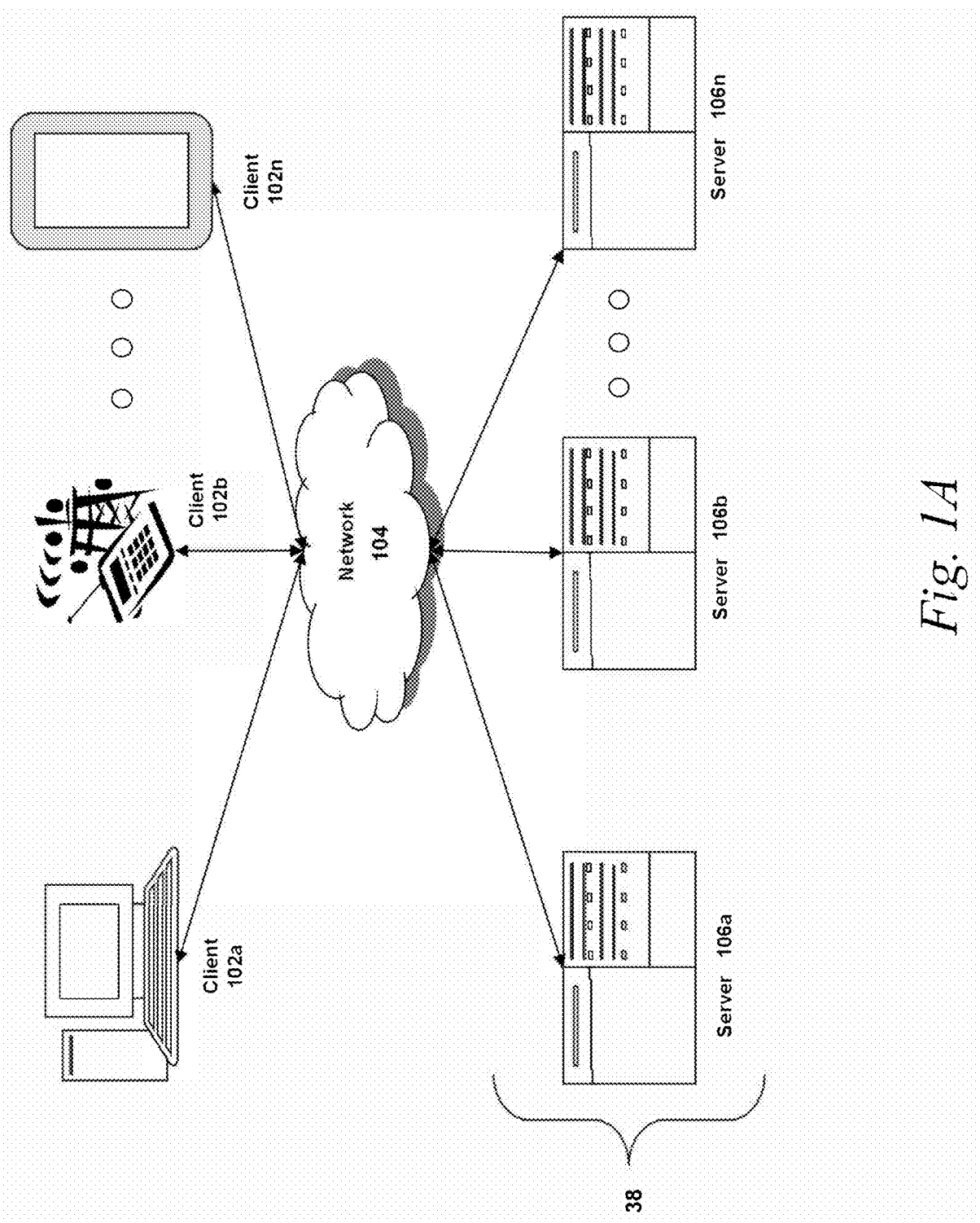
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s)

102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In some embodiments, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In some embodiments, the server 106 may be referred to as a remote machine or a node. In another embodiment, a plurality of nodes 290 may be in the path between any two communicating servers.

Figure 1B:
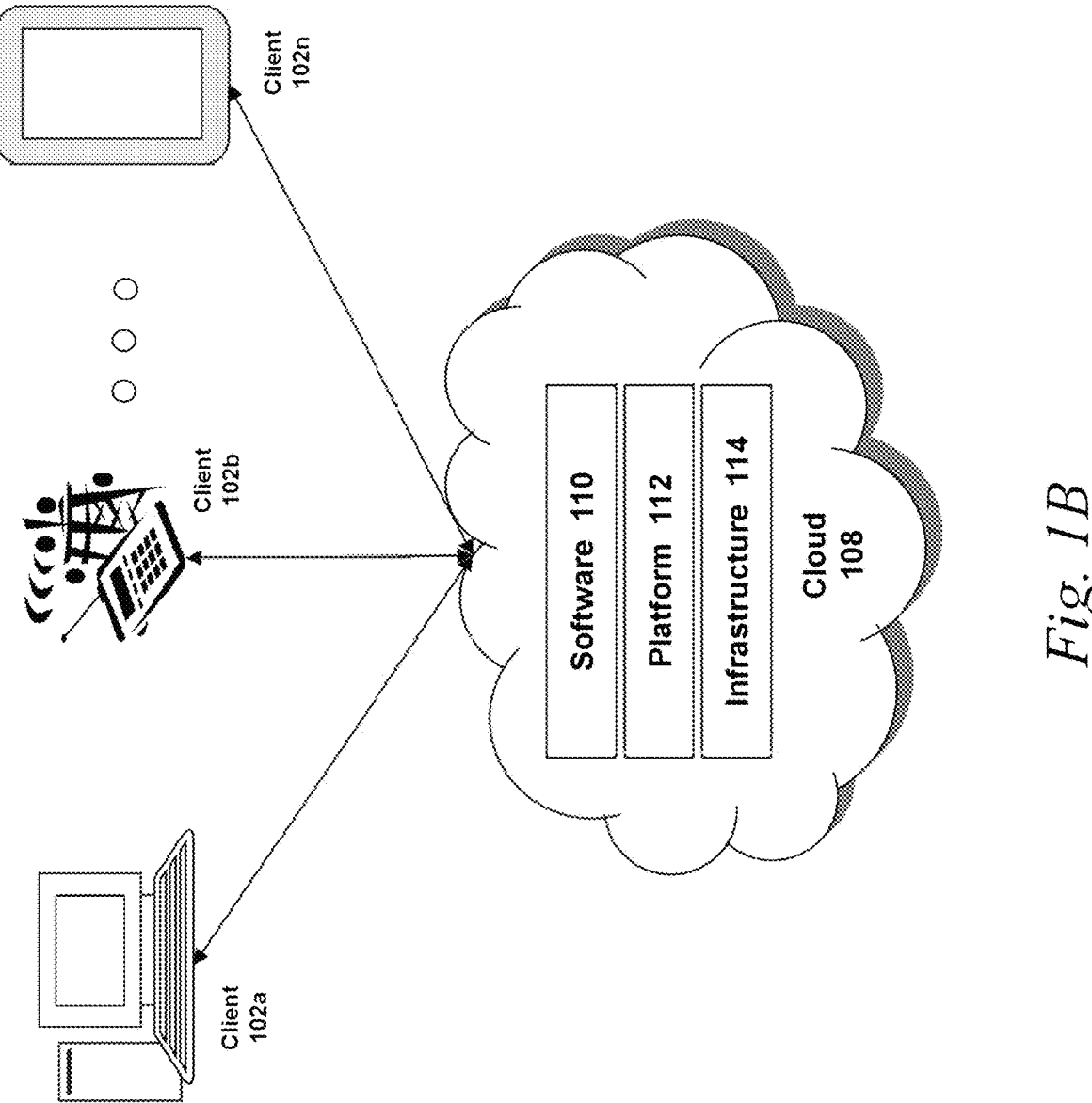
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102*a*-102*n*, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
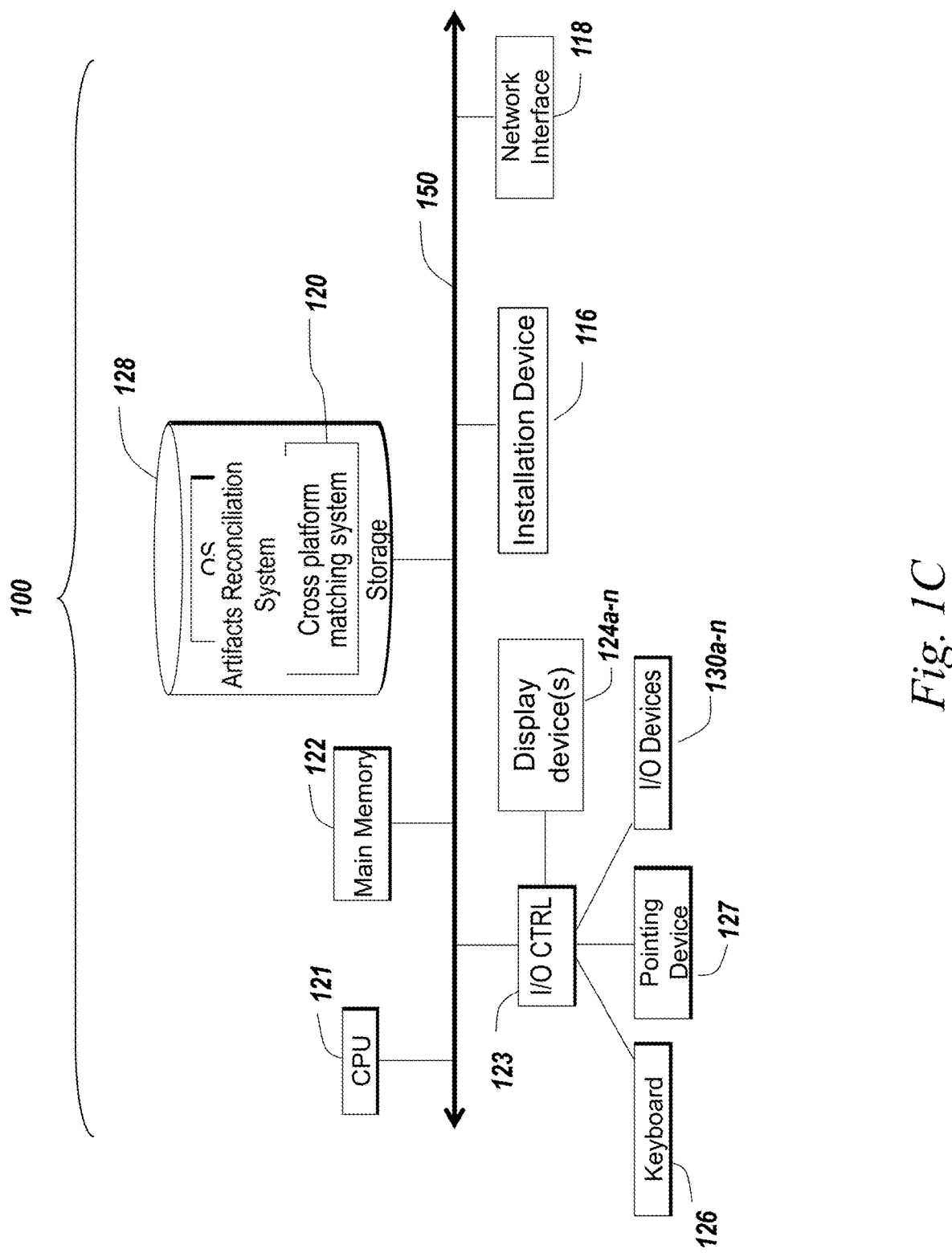
FIGS. 1C and 1D are block diagrams depicting embodiments of computing devices useful in connection with the methods and systems described herein.
Figure 1D:
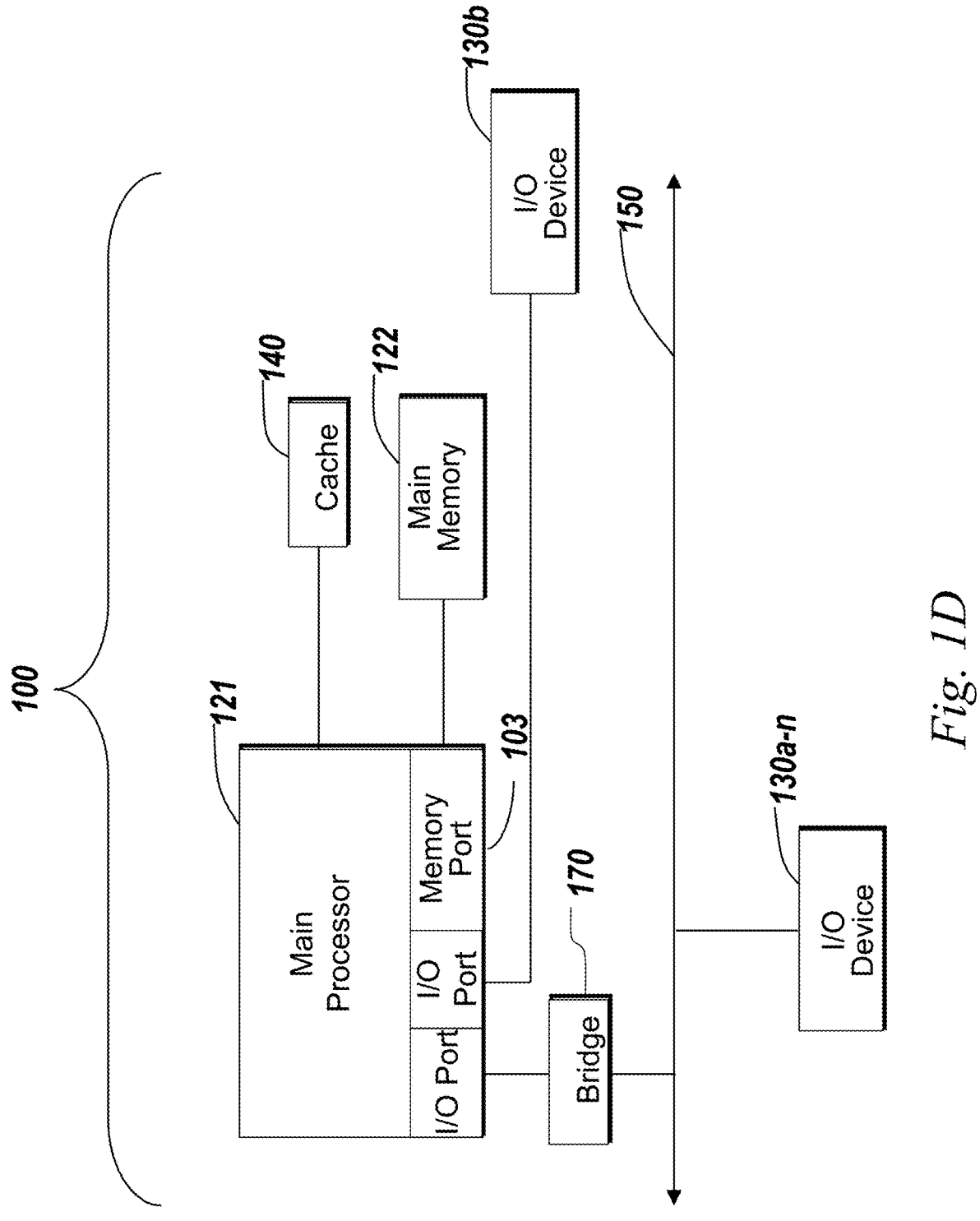

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124*a*-124*n*, a keyboard 126 and a pointing device 127, e.g. a mouse. The storage device 128 may include, without limitation, an operating system, software, and a software of an automated audit artifacts reconciliation system 120. As shown in FIG. 1D, each computing device 100 may also include additional optional elements, e.g. a memory port 103, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANS-PORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a Fire Wire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In some embodiments, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in some embodiments, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the experiment tracker system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In some embodiments, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESS-CARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Automated Audit Artifact Reconciliation

Systems and method of the present solution are directed to automated audit artifact reconciliation. Automated audit artifact reconciliation may refer to reconciling various artifacts to various associated records (e.g., matches) throughout a data set such as a plurality of enterprise database servers. For example, an artifact may be received by a user, such as an employee identifier, or transaction record, and the system may reconcile said artifact with corresponding matches, near matches, etc. The artifact may comprise user entered data, system generated data, computed or otherwise derived data, etc. For example, one or more similar identifiers may reveal access credential variants of the user, or of similar users that may otherwise be conflated for the user. Similarly, one or more similar transactions may identify a target transaction, or identify similar transaction (e.g., to build predictive profiles indicative of fraud or other suspicious transactions).

A data processing system comprises a plurality of components, any of which may be hardware or software components. In various embodiments, one or more components of the data processing system may be collocated or remote, communicatively coupled with other components (e.g., bidirectional, or unidirectional). In some embodiments, two or more communications channels form a network, which may route various data between data processing system components, and additional devices (e.g., the components of the data processing system may be interconnected by a local access network the internet, etc.). Advantageously, collocating the various components may allow sharing of memory, resources, etc. and may simplify management of files throughout a dispersed network. Data processing system where individual components are dispersed may, advantageously, case access of access additional networks or information, as may be needed. For example, various networks or data storage systems the data processing system may interact with may be protected by network filters, firewalls, etc. Thus, the data processing system or individual components thereof may comprise multiple instantiations to interact with counterpart systems, or users. For example, a GUI on a user workstation may be duplicated by a mobile application, an email etc.

Figure 2:
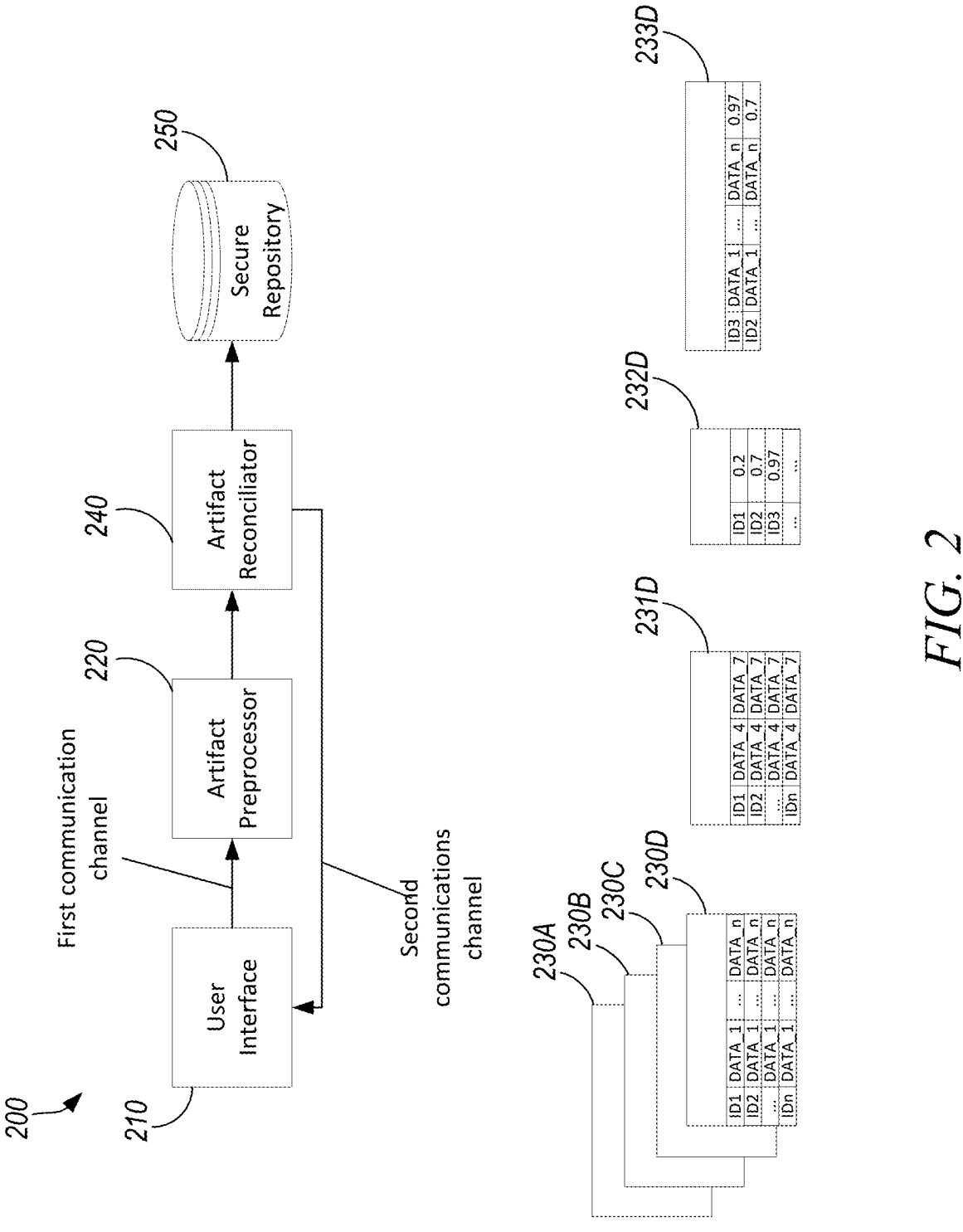
FIG. 2 is a block diagrams depicting embodiments of a data processing system and data structures useful in connection with the methods and systems described herein.

FIG. 2 is a block diagram depicting embodiments of components of a data processing system 200 and data useful in connection with the methods and systems described herein. A user interface 210 provides an input/output interface to a user, and is communicatively coupled, through one or more communications channels, with one or more data processing system 200 components. An artifact preprocessor 220 is a hardware or software component communicatively coupled to the user interface, and to one or more additional data sources (not depicted) storing a plurality of input data structures 230A-D (e.g., files) thereupon. The input data structures 230A-D may comprise one or more rows, wherein each row is associated with an identifier. One or more columns are associated with each row. Each column includes a plurality of data fields associated with the identifier. An input data structures 230A-D may be processed to generate a validated data structure 231D, wherein one or more columns of interest are validated as present in the data structure.

The artifact reconciliator 240 is a hardware and/or software processing component of the data processing system 200, which is communicatively coupled to a secure repository 250, and to the data preprocessor (e.g., to receive the validated data structure 231D). Each row of the validated data structure 231D may comprise fields which may be amendable to processing to determine a match to an input value. For example, a match score data structure 232D may be generated from the validated data structure 231D relative to an artifact (e.g., an input value received through the user interface 210). The artifact reconciliator 240 may also be communicatively coupled to the user interface. The secure repository 250 is a storage location communicatively coupled to the artifact reconciliator wherein access to a file may require a credential which may be provided, for example, to the artifact reconciliator or through the user interface. The secure repository 250 is configured to store a plurality of files. For example, the secure repository 250 may store the match score data structure 232D, or may append the match score data into a consolidated data structure 233D. The artifact reconciliatory may include a custom tool which may be a hardware implemented processing (e.g., via a field programmable gate array device) or a software implementation including one or more executable applications or script based instructions. The various processes herein may comprise a variety of applications, scripts, hardware, etc.

The user interface 210 provides input and output capability for a user to interact with other components of the data processing system 200. Although the user interface may, in some instances, operate with a singular user, the user interface may be configured to interface with a plurality of users. The users may access the user interface 210 with one or more credentials, over one or more communication channels, etc. In some embodiments, the user interface may be configured to present different data to different users. For example, the user interface 210 may be configured to associate actions with a particular user, a particular class of user, etc. such that the content or prominence information may be varied in interactions, displays, etc. depending on a particular user or class of user. The user interface 210 may comprise one or more graphical user interfaces (GUI) to receive user entries (e.g., artifacts), display information relevant to those entries, etc. The user interface 210 may also be configured to access additional information (e.g., information stored thereupon, or accessible via communication channels with additional data processing system 200 components).

In some embodiments, the user interface may be configured to present additional information to a user, such as in response to information (e.g., artifacts) entered by the user. For example, the user interface may comprise an interactive GUI which is configured to depict a user entered artifact, and additional information associated with that artifact. For example, any default values, associated information or the availability thereof, etc. may be presented to the user through the GUI, email, etc.

One or more of the communication channels between the user and the user interface, or the user interface 210 and additional components of the data processing system 200 may be configured as secure channels. Such secure channels may require an authorization prior to opening or operating the channels, or may encrypt or otherwise secure the data in the channels. For example, the user interface may be configured with one or more authorization credentials, or hashes or salts of authorization credentials such that upon receipt of a credential, the user interface may verify a user access authorization the data processing system 200, a component thereof, or data stored thereupon. Some credentials/tokens may rely on a shared secret between any of the user, the user interface 210, and a credential manager.

In some embodiments, various components of the user interface 210 may be associated with or distributed among various components of the data processing system 200. For example, a graphical user interface may be closely associated and/or hosted by an artifact preprocessor 220, or may share hardware or software components therewith. The user interface may also comprise a communication channel comprising an email function which may be closely associated with the secure repository. A communication channel comprising an email function associated with the artifact preprocessor 220 may be independent of, related to, or the same communication channel. The user interface may also communicate with a user by additional channels, such as SMS, additional applications having push or pull notifications, etc. In some embodiments, the user interface may be configurable to communicate with a user based on a preferred communication channel.

The artifact preprocessor 220 is a hardware or software component having components to receive, store, process, and transmit data. The data may be stored by volatile or non-volatile memory. The artifact preprocessor 220 is communicatively coupled with various data processing system 200 components. For example, a communication channel with the user interface may be present (e.g., to receive various artifacts and provide a user with various notifications and information). A further communication channel with the artifact reconciliator 240 may enable the artifact preprocessor 220 to pass various data to the artifact reconciliator 240, as will be discussed, herein. Additional communications channels may be configured to communicate with additional data storage locations. For example, various data input structures 230 may be received over one or more communications channels. The artifact preprocessor may be configured to perform various process flows as will be discussed with respect to method 300. In some embodiments, the artifact preprocessor 220 may be Robotic Process Automation (RPA) software.

The input data structure 230 is a data structure (e.g., a file) which includes one or more rows, wherein each row is associated with one or more columns. A plurality of rows may each be associated with an identifier or another artifact. The columns of each row may contain data recited to the identifier. (e.g., name, user name, email, identification number, network identifier, dates and addresses relevant to the identifier, etc.) Such a data structure may be used to identify an individual or organization associated with an artifact (e.g., an artifact entered by a user through the user interface 210). In another example, the rows may each be associated with a transaction (e.g., a payment, a data transfer, etc.) and the columns may comprise information related to the transaction (e.g., a transaction approver, a transaction amount, a transaction time, etc.). Such a data structure may be used to identify a nonconforming transaction or another transaction of interest.

The row/column nomenclature is not intended to convey a physical description of the presentation of the data. The rows and columns may be organized as a matrix, array, relational database, etc. The rows and columns are merely provided to accord with the description of FIG. 2, and for their simplicity. A column refers to one or more data fields of a related type which are each associated with a row, and a row refers to one or more data fields, which are each associated with a data field in each of the one or more columns. In some embodiments, a particular relationship between the row and column may be a text field, a default value (such as 0, or −1), or may be a null value (e.g., an email field associated with an employee who is not assigned an email).

The validated input data structure 231 is a data structure which has been validated to contain specified content, such as columns. For example, the presence of a particular column description, header, number, label, etc., or the state of one or more of the fields associated with the columns (e.g., nullness, completeness, departure from a default value, etc.) may be validated. In many embodiments, the validated data structure 231 may be abridged. For example, if an input data structure 231 is a large database having many associations, and many columns of data per desired identifier, the validated input data structure 231 may contain a reduced set. For example, the depicted input data structure 231D is shown having only two columns, of n columns provided in the depicted input data structure 230D. Advantageously, such an abridgement may contain less data, which may lower computational requirements (e.g., storage space, processing power, etc.) in various operations of the methods herein described.

The artifact reconciliator 240 is a hardware or software component having components to receive, store process, and transmit data. More particularly, the artifact reconciliator 240 comprises instructions to implement fuzzy logic matching as will be further described with regards to the methods described herein. The artifact reconciliator 240 also includes communication channels with the artifact preprocessor 220, and the secure repository 250.

The match score data structure 232 is a data structure including a quantified similarity between the rows of a validated input data structure 231, and an artifact (e.g., an entry provided via the user interface). In some embodiments, the match score data structure 232 may comprise a match score for each row of an associated data structure. In some embodiments, the match score data structure 232 may include match information for a subset of rows, such as one row, as will be discussed according to the methods described herein. The match score data structure may comprise information intended for output to a user, or may be intended for combination with a plurality of additional data to form the consolidated data structure 233. The consolidated data structure 233 may include some or all of the match data, and additional information, such as the data of the input data structure 230, validated input data structure 231, etc. In some embodiments, the generation of the consolidated data structure 233 may comprise abridging data from the match score data structure 232. For example, the consolidated data structure 233 may contain a single row related to a match. In some embodiments, the consolidated data structure 233 may include data related to an aggregate number of input data structures 230 or validated input data structure 231. For example, a consolidated data structure 233 may include one or more matches from a plurality of associated data structures based on a batch query of a user, comprising a plurality of artifacts. The match score data structure 232 or the consolidated data structure 233 may be transferred to a secure repository 250 for access by the user.

The secure repository 250 is a storage location requiring one or more credentials, tokens, access control lists, etc. for access for various data stored thereupon or otherwise caused to be accessible. The secure repository 250 may also include processing capability, and be communicatively coupled to the user via the user interface 210. For example, the secure repository 250 may be configured to provide updates to the user (e.g., via email, via one or more GUIs, etc.). In some embodiments, secure repository 250 may be configured to send these communications directly. In some embodiments, the secure repository 250 be configured to cause another data processing system 200 component to cause such notifications to be sent. The secure repository may further comprise processing capability which may be used to encrypt or decrypt files, provision access to files, respond to various events, such as the availability of data, etc.

The various components described herein may be communicatively coupled with one or more processors configured to execute instructions. For example, those instructions may cause various methods to be performed, such as the methods that follow.

Figure 3A:
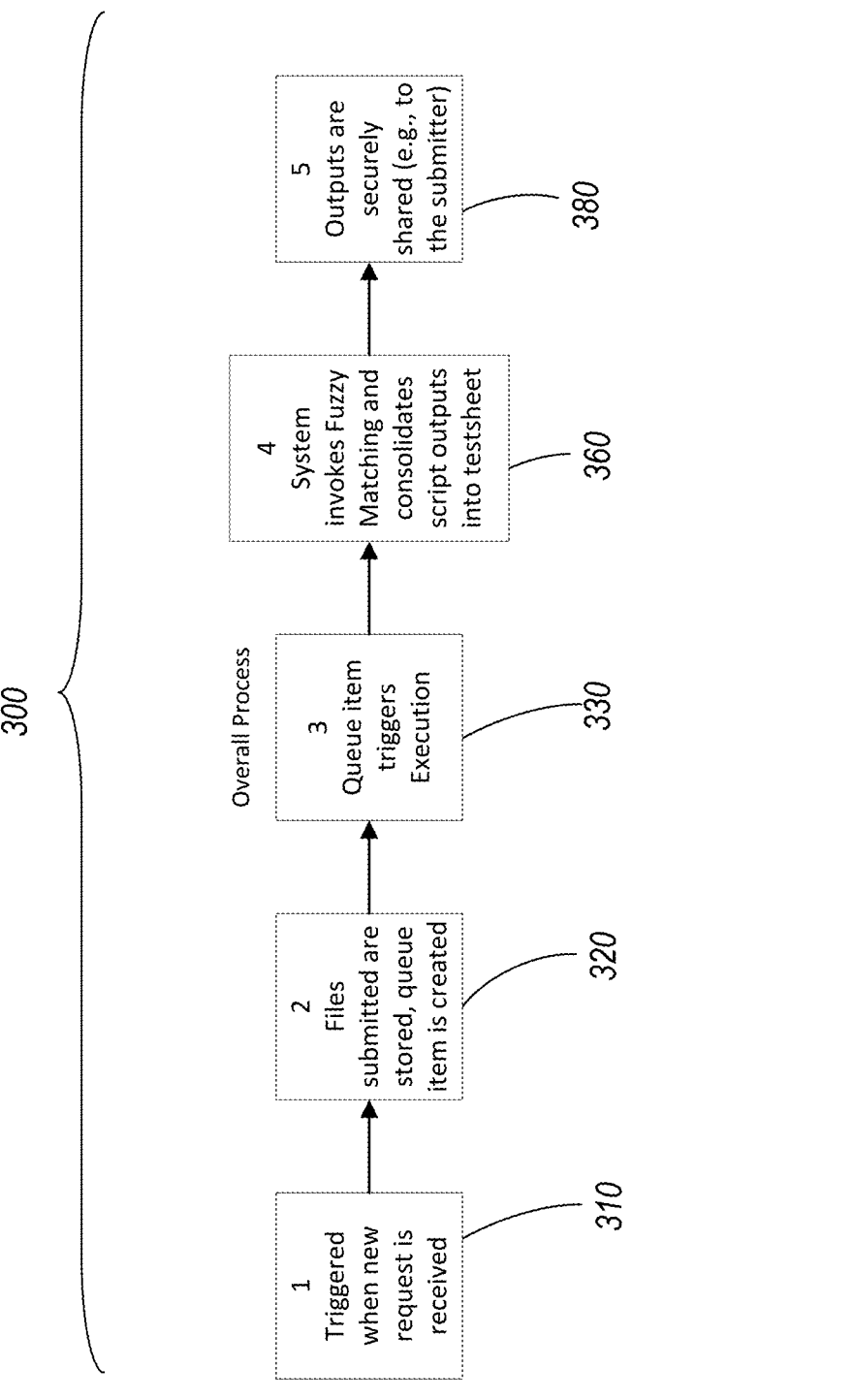
FIGS. 3A, 3B, 3C, 3D, 3E, and 3F are flow diagrams depicting embodiments of a method of automated audit artifact reconciliation.

FIG. 3A is a flow diagrams depicting an embodiment of a method of automated audit artifact reconciliation. At operation 310, a request is received, via the user interface, comprising an artifact (e.g., one or more input values) related to a query. At operation 320, the input data values are processed to generate a query. At operation 330, the artifact preprocessor gathers various input data structures, responsive to the query, and generates a validated data structure for presentation to the artifact reconciliator, or provides a notification, through the user interface, of a failure (e.g., because one or more input data structures or columns thereof are inaccessible). At operation 360, the artifact reconciliator determines a match between one or more rows of the validated data structures, and generates a match score data structure or a consolidated data structure. Also, at operation 360, the artifact reconciliator transmits the match score data structure or the consolidated data to a secure repository for later access (such as via the user interface). At operation 380, the secure repository provisions and stores the information received by the artifact reconciliator, establishes access controls associated with the data whereby at least one user may access the information, and causes a notification to be provided to the user.

Referring again to operation 310, one or more artifacts are received by the user interface. An artifact may comprise an identifier of an entity. Where the entity is an individual, department, or a collection of employees, the artifact may comprise a name, user name, email address, employee identification number, network identifier, job title, etc. Not all identifiers will be selected for their relation to an entity. For example, the present disclosure also contemplates artifacts of other information, such as transaction types, vendor identities, etc. The references herein to an identifier associated with an entity such as an individual are merely for the sake of illustration, and are not intended to limit this disclosure.

In some embodiments, a user enters an artifact associated with an employee (e.g., a former employee). The user may also enter additional inputs, such as a termination date, desired confidence threshold, and may associate stores of information associated with the employee. For example, the user may enter a plurality of software applications which the user may have (or had) access to, and which include user access credentials and logging. For example, a list of software applications may be manually entered, a predefined list of software applications may be selected based on an employee classification or other criteria, or all of an available list of software applications may be indicated.

The user interface may include various shortcuts, saved lists, default values, etc. which may minimize the number of input values a user is required to enter, or may allow the user to select aggregated data based on an interface. For example, a default confidence threshold may be applied to a search unless a user selects another or different confidence threshold, or a default confidence threshold may always be used, absent presentation to the user.

Figure 3B:
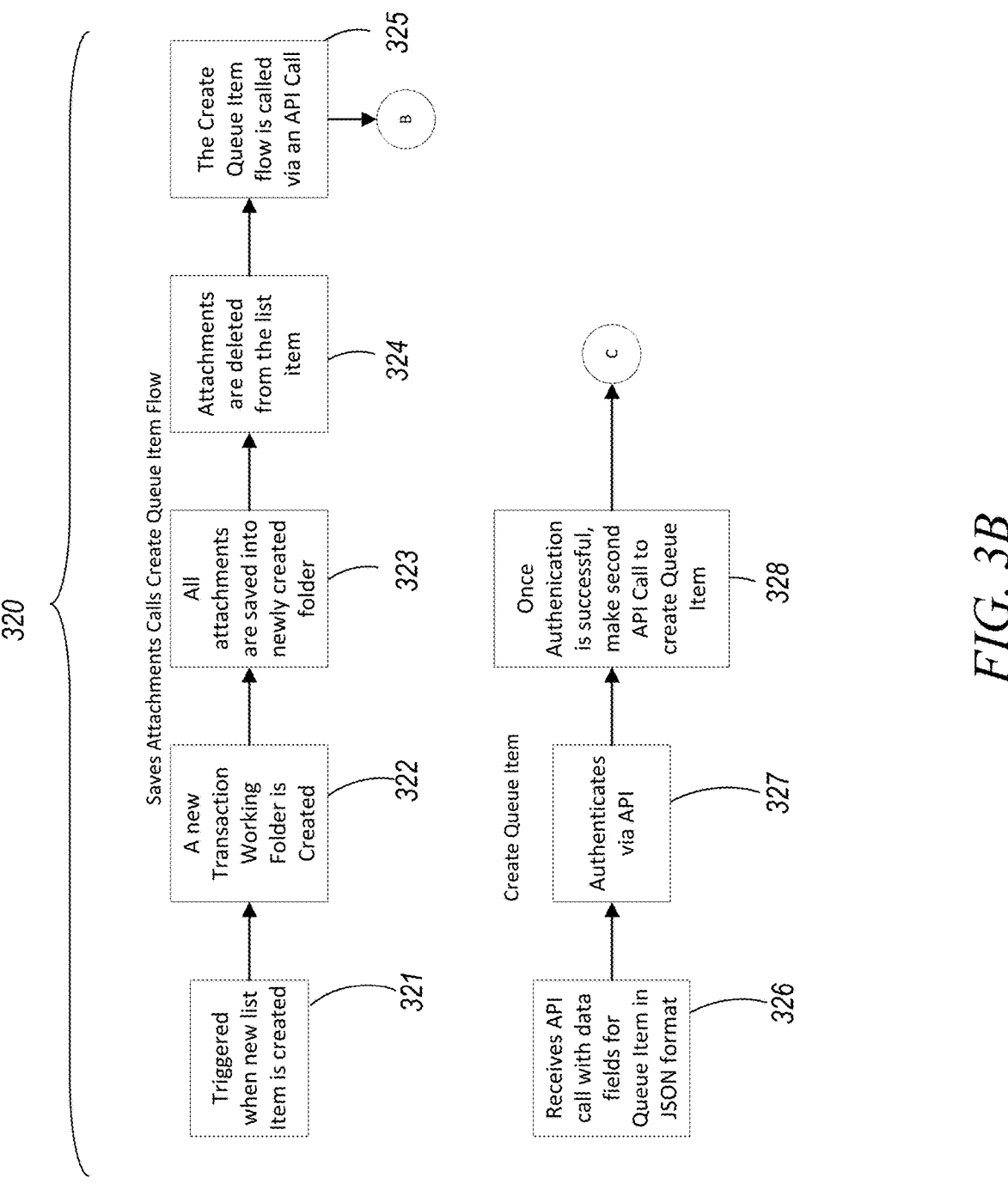

FIG. 3B depicts various embodiments of operation 320, wherein the operation is depicted as a series of sub-operations. At operation 321, a new artifact is detected (e.g., by the artifact preprocessor). This detection may be based on the receipt of a message from the user interface, polling a predefined location, etc. At operation 322, a location is associated with the artifact, which may involve assigning the artifact to a pre-defined location, allocating a new location, etc. The location may be accessible by any of the artifact preprocessor, the artifact reconciliator, or the secure repository. The location may be a fixed memory location (e.g., in volatile or non-volatile memory) or may be defined by a pointer, tag, path, etc. At operation 323, the one or more artifacts or associated inputs are stored to the location. For example, the artifacts may be an employee identifier, a termination date, an employee category, and a desired confidence threshold, and may be stored to the location. At operation 324, attachments are deleted from the location they were originally detected, in order to avoid repeated detection and provisioning of a location. Such a deletion may also indicate (e.g., to a user) that the item has been detected. Some embodiments may use other techniques to avoid re-detection of an item, or provide notification of detection. For example, a status bit may indicate that a file has been accessed and processing/pre-processing has started, a notification can be sent via the user interface (e.g., an indication of the item on a GUI may be indicated with elevated or reduced prominence, or an email may be provided to a user upon the completion of operation 323, etc.).

At operation 325, the artifact is passed to another function, application, server, etc. In some embodiments, this may be performed by passing the data to another application though the use of an application programming interface (API). In some embodiments, the data may be performed by calling a function within an application. In some embodiments, the artifacts may be combined with additional information. For example, the artifacts may be combined with default values, or mapped information (column data mapped to an employee category in a lookup table). Additional data such as an associated user, a time stamp of a request, a date of a request, an output path for later file access, an additional output path (e.g., to indicate a failure), various confidence levels, etc. may also be included. Such information may be used for data processing purposes (e.g., to limit a search), or to provide data in an output file that may allow a recipient such as a component of the data processing system, or a person to contextualize the data contained in an output file.

Operation 325 may be performed throughout the disclosed method 300. Indeed, various operations disclosed herein may be repeated or substituted, omitted, etc. The various sub operations of the method operations may be performed in various sequences; the sequence the various operations are disclosed in is not intended to be limiting. Operation 325 may also comprise storing the input values or other information associated with the input values in a standard format (e.g., JavaScript Object Notation, JSON), which may simplify the passing of the data (e.g., within or between applications). For example, a standard format may minimize the processing performed by a function, application, etc., which receives the information at operation 326.

At operation 327, the artifact preprocessor may authenticate a counterpart component (e.g., another subcomponent of the data processing system such as the artifact preprocessor, another subcomponent of the artifact reconciliator, or a device other than the data processing system). Like other operations of the disclosed method 300, authentication may be performed throughout. Some operations may be implicitly authenticated (e.g., by common access to a memory protected by an operating system). In some embodiments, explicit authentication may be required incident to sending, receiving, storing, or processing information. Following successful authentication, the data may be transferred such as through a function call, an API to another application, etc. at operation 328. Conversely, responsive to unsuccessful authentication, provision for various retries, notifications, logging, etc. may be performed (not depicted).

Figure 3C:
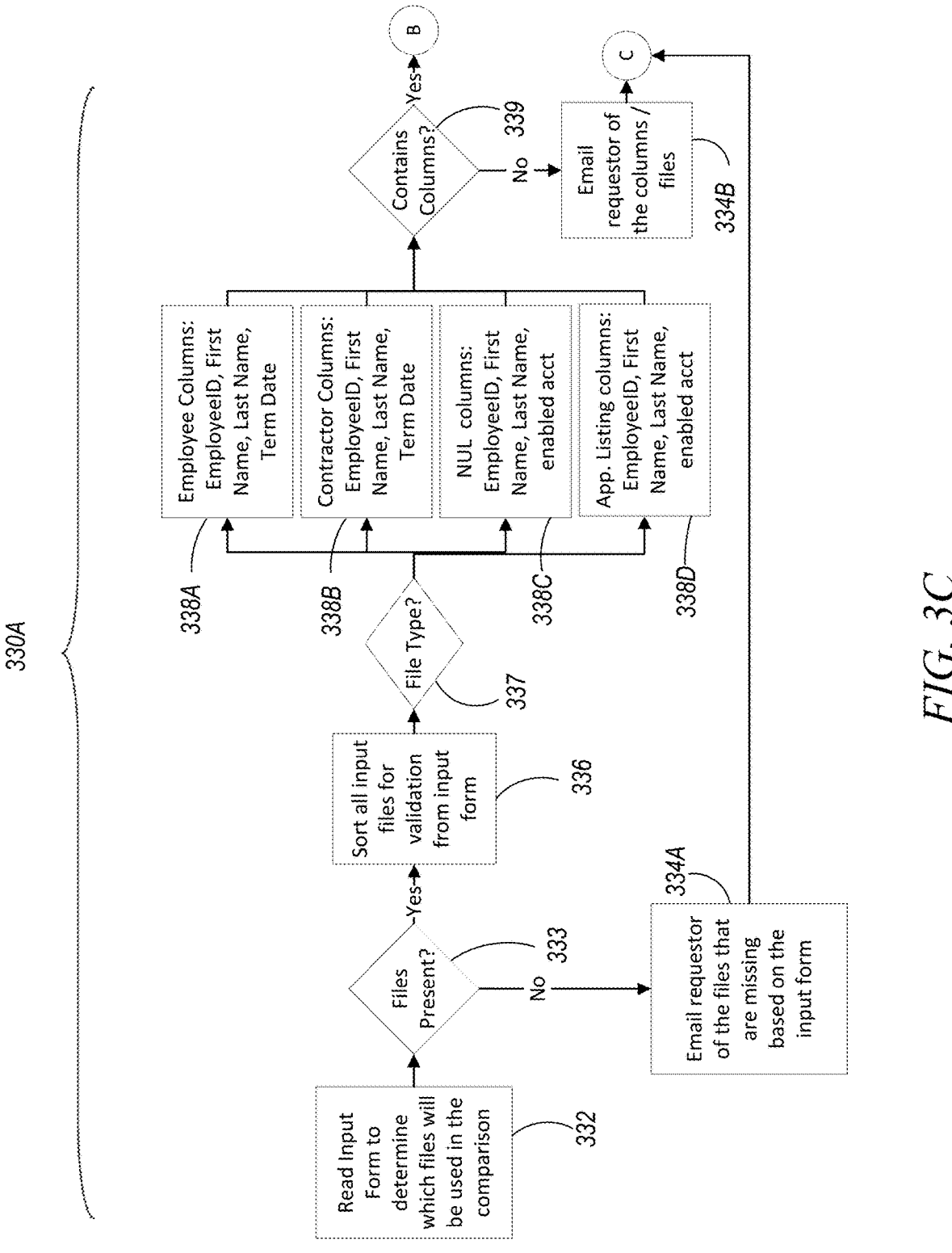
Figure 3D:
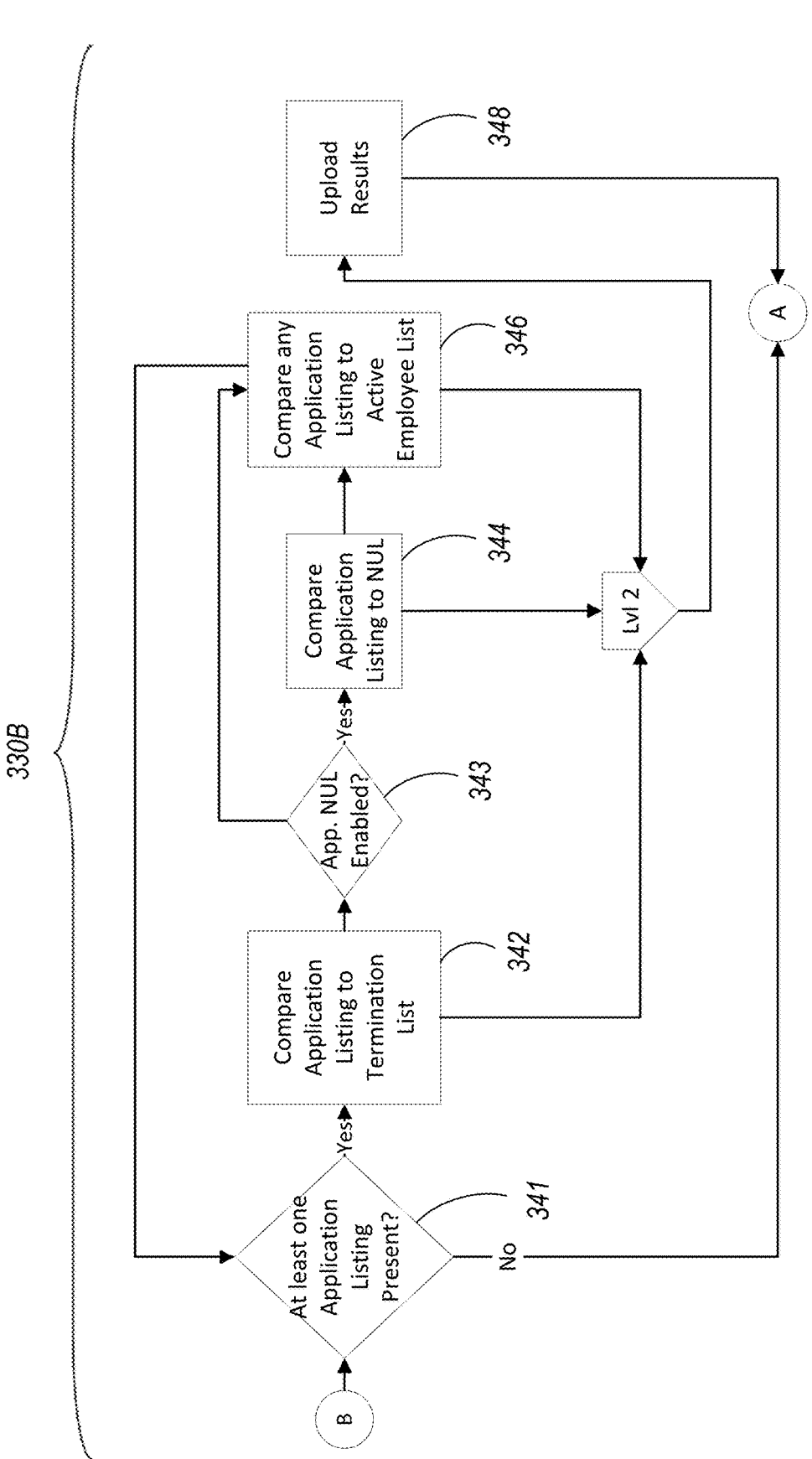
Figure 3E:
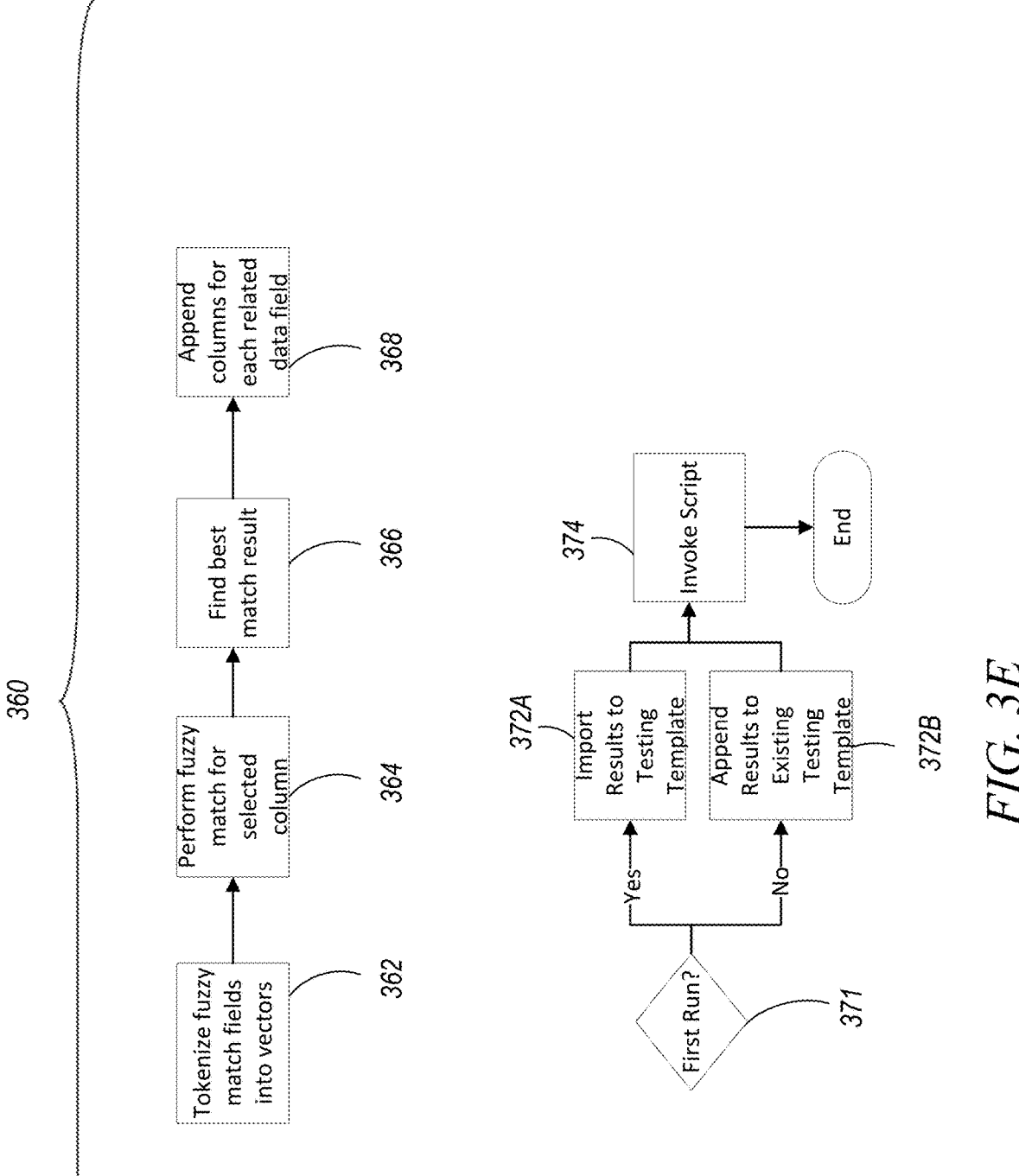

FIGS. 3C-3E depict various embodiments of operation 330. Referring to FIG. 3C, various sub operations thereof are disclosed. At operation 332, information received from operation 328 may be processed to determine one or more required input data structures. For example, the data structures may be application logs or user lists for a plurality of applications throughout an enterprise, and may be associated with the input form data (e.g., based on the employee category or other attributes of the identifier.) In another example, the identifier may identify a transaction identity or type such as an approval of a loan variance. The disclosure may be practiced to reconcile many additional artifacts, or variants of the artifacts described herein.

At operation 333, a determination of whether the required input data structures (e.g., files, matrices, arrays, etc.) are present is conducted. The operation may include verifying an accessibility of one or more files (e.g., from one or more applications or other data sources), or may include verifying the presence of the input data structures themselves (e.g., if the input data structures are received as user inputs or otherwise associated with entries and stored at operation 310 or 320). If the input data structures are not accessible, a data processing system 200 component, such as the input data structure may notify a user such as through a communication channel, which may comprise the user interface (e.g., an email) at operation 334A. The data processing system 200 may also determine that all requisite input data structures are accessible and proceed with the method 300.

The data processing system may further process the input data structures according to one or more types, or otherwise associate the input data structure with one or more columns thereof at operation 337. For example, in the depicted flow diagram, an input data structures may be a listing of active or terminated employees 338A, an active contractor 338B or employee list 338C or an application listing 338D. Each input data structure type may be have an associated list of columns which are required for further processing, and the system may be configured to determine a input data structures type based on the presence or absence of these columns, or other data such as file names, transmission paths, etc. The files types may be associated with columns which are identified based on a name (e.g., employee ID, first name, last name, middle name, last name, termination date account activation date, account deactivation date, network identifier, etc.), or a tokenized identifier (e.g., column 54), or based on the content of a columns data (e.g., a column comprised of 7 digit alpha-numeric combinations). At operation 339, the artifact preprocessor determines whether all columns are available for further processing. If any required columns are not present, not identifiable, null, or otherwise unavailable for further processing, the method 300 may conduct operation 334B wherein the user may be notified via the user interface according to the same communication channel as 334A, or a different communication channel. The data processing system may determine the requisite columns are validated as present, and the operation proceeds with the validated input data structure (e.g., to operation 341).

Referring to FIG. 3D, additional operations of the method 300 which are performed by the artifact preprocessor are disclosed. At operation 341, the artifact preprocessor reviews the validated input data structure for potentially relevant information associated with the identifier. In some embodiments, potentially relevant information may comprise one or more applications associated with a terminated employee. If potentially relevant information cannot be identified, the method may terminate, which may involve data clean up, notification, logging, etc. In some embodiments, if potentially relevant information is identified, the method 300 may conduct operation 342, wherein a comparison between the potentially relevant information and one or more validated input data structures is conducted.

Operation 342 may be conducted by the artifact reconciliator, which may enable fuzzy matches (a method for which is described in greater detail by the discussion of FIG. 3E). For example, a list of applications may be compared to a list of terminations to determine matches of applications the user may have access to. In some embodiments, an exact match for an artifact may not be returned, because of minor variations between identifiers. For example, if an artifact comprises a text entry of "John Doe", but an input data structure contains a string of "John Doe," an exact match may not be returned. In some implementations or embodiments, an artifact of John Doe may comprise a user name of "j.doe," and an exact match may be detected, but that match may be for "James Doe," which may lead to an erroneous match. Some potentially relevant information may require additional data sources. In some implementations or embodiments, matching may be performed by the artifact preprocessor. For example, certain system generated column matches may be conducted by the artifact preprocessor where only an exact match is useful (e.g., in a dataset comprising known unique and known valid data).

In some embodiments, the artifact preprocessor and artifact reconciliator may both detect exact matches (e.g., for later comparison or voting), or the artifact reconciliator may be called to conduct fuzzy matching upon a failure of the artifact preprocessor to reconcile one or more matches. In some embodiments, the artifact preprocessor may be used for some input data structure types and the artifact reconciliatory may be used for other input data structure types. In still further embodiments, the artifact reconciliatory may be used to conduct (fuzzy) matches to the exclusion of the artifact preprocessor.

A plurality of types of data input structures may be processed. In some embodiments, a determination that an additional source identifier is required, at operation 343. For example, an application list may be determined to be associated with an active directory service. That active directory service may be accessed to retrieve various data associated with an identifier in operation 343. If no such service exists, accessing such a service may by bypassed. For example, the method 300 may proceed to operation 346, where another comparison is made. For example, at operation 346, an active list of employees may be compared to another input data structure such as an application list.

Thus, the depicted flow diagram comprise three comparisons (operations 342, operation 344, and operation 346) to various input data structure types, such as a network user list NUL (e.g., an Active Directory). The number and detail of these comparison operations are merely illustrative. Additional, fewer, or different comparisons may be conducted in many embodiments based on an identifier type, a number of available data fields/columns, a desired sensitivity, criticality of locating a match, etc. The various thresholds and variations described herein may be tailored to any number of input data structure types. For example, each input data structure type may have an associated confidence interval, required columns, etc. At operation 348, the comparison results are sent to the secure repository or to an intermediate storage location while awaiting completion of other operations. The operations of the data upon arrival at the secure repository are explored in greater detail in the discussion of FIG. 3F.

Matching may comprise identifying an exact match, identifying a match between data types (e.g., a character for character match between a free text field and a string), or may involve additional operations. For example, operation 360 depicts additional matching operations that may be conducted, as further depicted in FIG. 3E, and as follows.

Referring to FIG. 3E, operation 360 is depicted as a plurality of sub operations. For example, at operation 362, fields of the validated input data structures are tokenized. Tokenization may comprise parsing various fields for grams of a fixed length. For example, the grams may be a fixed length of space delimited words, comma separated variables, numeric digits, etc. In some embodiments, the gram is a gram of characters (which may be parsed from text in various data types). The length may be predefined, an input or default value, or a plurality of lengths may be selected, and the results may thereafter be harmonized. In some embodiments, the gram is of a fixed length (e.g., 2, 3, 4, or 5 characters). In some embodiments, certain characters may be disregarded or merged into a single character type. For example, tabs, spaces, carriage returns, etc. may be disregarded or consolidated. Similarly, capitalized characters and un-capitalized characters may be merged into a single character (e.g., to enable a case insensitive search), or may be treated independently. A number of each particular gram may be calculated for each row of a validated input data structure.

For example, a row of a data structure associated with an identifier of jd1 may include columns 7, 14, and 23. Each column may be associated with a text field containing, respectively, the data "j.doe," "John Doe," and "johndoe3@companyname.com." Such data may be parsed for a character gram of a length of 3 to determine that 3 instances of "doe" are present, and one instance of "ame" is present (as well as many additional grams). An additional row may comprise, in the same respective columns, for an identifier of jd2 "james.d" "James Doe," and "jamesdoe@companyname.com." such data may be parsed to determine a count of 2 grams of "doe," and 4 grams of "ame" (in each case, presuming a case insensitive search). In some embodiments, additional rows may be present. A normalized occurrence per row may be 1.5 for "ame" and 0.5 for "doe." The average occurrence may be normalized for row length, number of valid entries per row, etc., or may be a simple mean of the occurrence numbers.

An inverse weighting based on overall frequency may be determined for each gram. In the example of jd1, the 3 instances of doc may be normalized to a score of 6 based on division by the occurrence rate (3/0.5=6). Similarly, the "ame" may be normalized to 0.67 (1/1.5=0.67). By a similar method, the grams of jd2 may be weighted to a normalized value of 4 for "doe" (2/1=2) and 2.67 for "ame" (4/1.5=2.67). In some embodiments, additional or different weighting calculations (e.g., non-linear relationships) may be applied to determine a normalized weight of the various grams. These normalized occurrence rates are stored. For some datasets, it may be advantageous to store this data as a sparse matrix. For example, for datasets having high entropy/diversity, many gram counts may be zero, and a sparse matrix may minimize a resulting file size.

At operation 364, a similarity is determined between the various data occurrence rates and at least one identifier. The similarity may comprise the magnitude or distance of the various identifiers. For example, cosine, dot product or Euclidean distance may be calculated. One or more highest match scores between an artifact and a row may be flagged for display to a user, retention, etc. Operation 364 may be repeated for any additional data input structures and/or artifacts.

At operation 366, zero or more matches for each data input structure is associated with (e.g., copied into) a data structure which may comprising the input artifact (e.g., the standard JSON format input data structure). Additional information may also be included, which may be a default behavior, responsive to a request submitted with the artifact, or otherwise selectable. Continuing the previous example concerned with terminated employees, the additional input data structures may relate to additional applications, and additional information may comprise a date of last access of the application, a version of data accessed, etc. For each input data structure, a top match is identified, which may thereafter be compared to a confidence threshold. A minimum confidence threshold for presentation may be used to determine if an identifier is indicated as a potential match. For example, if a minimum confidence threshold for presentation of 0.65 is established, and a highest row match of 0.58 is returned, then no matches may be displayed. In some implementations or embodiments, an anti-masking confidence threshold may be established. For example, if an anti-masking confidence threshold of 0.9 is established, and 7 results exceed 0.9, then all results may be indicated for display to a user. In some embodiments, a confidence threshold may be determined from an offset of a top match. For example, a top match and two adjacent matches may be displayed, or a top match, and any adjacent matches (i.e., near matches) within a predefined confidence threshold variance may be displayed. For example, the predefined offset confidence threshold variance may be 0.1, if a top match has a match of 0.85, all matches having a similarity in excess of 0.75 may be displayed. The various matches may also be ranked (e.g., as a process step or for presentation to a user). Such rankings may be quantified, or abstracted (e.g., likely match; possible match, etc.).

At operation 368, the match data may be merged into a consolidated data structure. For example, a match score may be appended (e.g., joined, associated, tagged, etc.) to one or more rows of the validated input data structure, or the input data structure. Thus, a consolidated data structure may comprise all related data columns of two data structures being compared (e.g., one associated with an artifact such as a user identification, and the second associated with an applications listing), as well as match data, a selected match, and one or more adjacent/near matches. In some embodiments, the consolidated data structure may comprise a subset of the (validated) input data structure, for example, may comprise only the rows associated with a match, adjacent matches, etc. The appended data may comprise additional rows, columns, additional data fields, etc. The data may also be appended beyond row column relationships (i.e., by tags associating various related data, file names, metadata, etc.) In some embodiments, the consolidated data structure may comprise data from a plurality of iterations of the various operations disclosed herein. For example, at operation 371, the data processing system 200 may determine whether a consolidated data structure has already been created, and may, in response, generate a new consolidated data structure to enter the results at operation 372A, or append the results to an existing consolidated data structure at operation 372B. Operation 374 may further process the data for presentation to a user. For example, various consolidated data structures may be aggregated, and stored in one or more locations. In some embodiments, the disclosed method 300 is performed for a plurality of identifiers, and the various identifiers are consolidated (e.g., prior to notifying the user of completion), and may further include one or more data sources used to perform the matching (e.g., data from the active directory). In some embodiments, the comparisons to any of the various confidence intervals may occur based on the consolidated data structure. In some embodiments, a recursive comparison may be made (e.g., if a first comparison returns an identifier of j.doc, that may be used in a further comparison, including a fuzzy comparison to detect further potential matches).

Figure 3F:
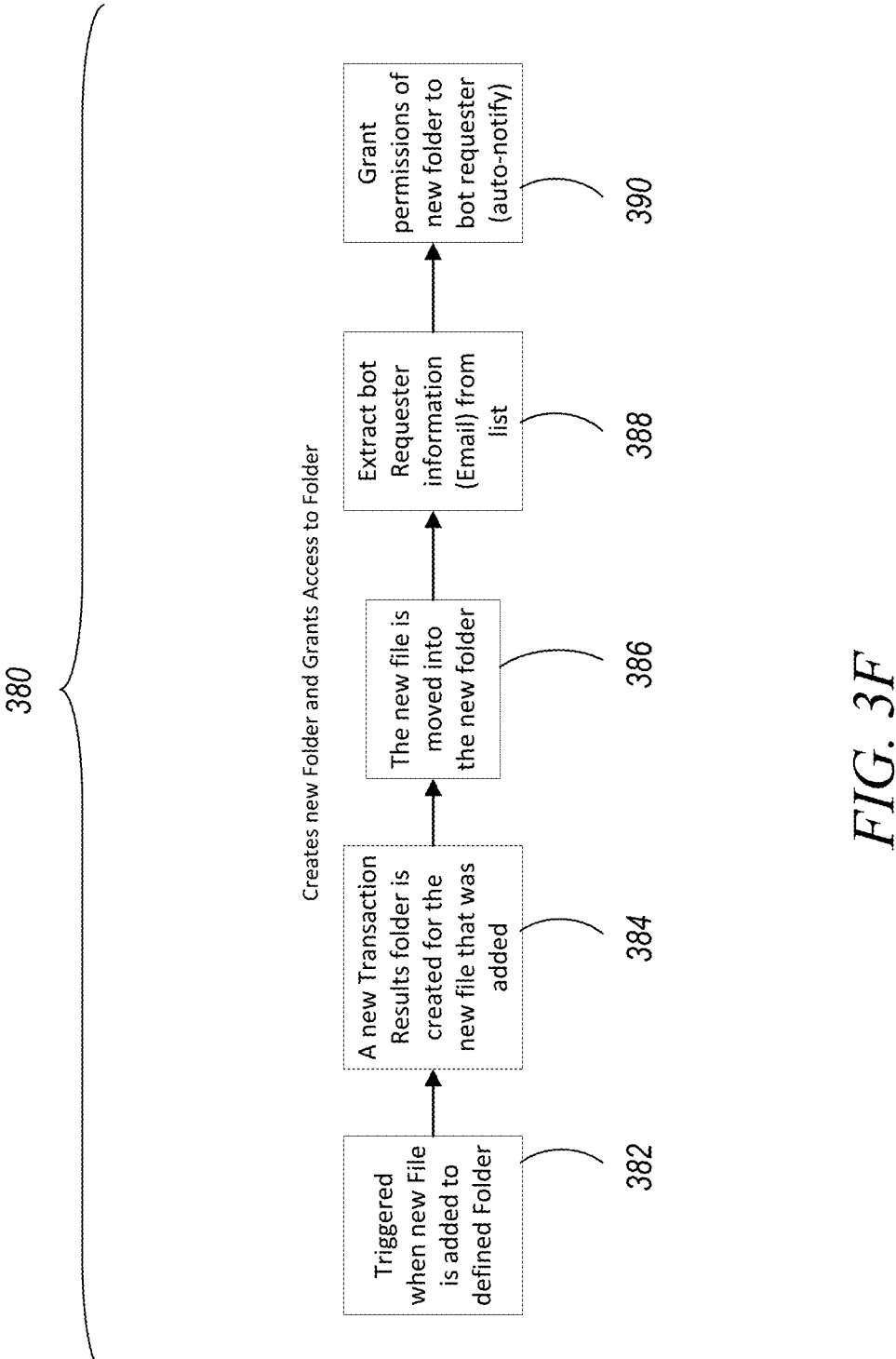

Referring to FIG. 3F, operation 380 is depicted as a plurality of sub operations. At operation 382, an aggregated/consolidated data structure is received at a secure repository. At operation 384, a location is defined for the aggregated/consolidated data structure. At operation 386, one or more output files based on the aggregated/consolidated data structure is moved into the defined location. The output file(s) may contain additional, lessor, or equivalent information as the received aggregated/consolidated data structure. In some embodiments, the output files may be in a human readable form (e.g., a text file, spreadsheet, etc.) and may have human accessible access controls applied thereto (e.g., may be password protected). At operation 388, a communication channel is associated with the aggregated/consolidated data structure such that a user may be notified of the file. At operation 390, the user is granted access rights to the aggregated/consolidated data structure, and a notification is provided to the user over said communication channel. For example, a notification may comprise an email, or another component of the user interface such as a GUI which may alert a user to the availability of the aggregated/consolidated data structure.

FIG. 4 is a flowchart of an example method 400 of reconciling artifacts, in accordance with some embodiments. The method may be used to identify matches for artifacts accessible to a data processing system. For example, at least some of the operations described in the method 400 can identify matches of a transaction signature, identifiers associated with a user, etc. The method 400 is disclosed as a non-limiting example; additional operations may be provided before, during, or after the various operations of method 400. Further, some operations may only be described briefly herein, however, the operations may be performed in conjunction with other methods, such as those disclosed herein.

In brief summary, a request is received to reconcile an artifact across a plurality of input structures at operation 410. At operation 420, predefined data fields are determined based on a type of an input data structure. At operation 430, predefined artifacts of data fields are compared between input data structures. At operation 440, matched artifacts are identified. At operation 450, an output file including a copy of one or more matched artifacts is created. At operation 460, the output file is stored in a location accessible via authentication.

Referring to operation 410, a data processing system receives a request to reconcile one or more artifacts across a plurality of input data structures. For example, the artifact can be received with the request, or directed to by the request. An artifact can be an identification such as an employee or contractor name, email, or login information, a transaction identifier, or an identifier of a date or location. The request can further specify one or more data structures to be reconciled. For example, the request can include one or more input data structures, or references thereto. For example, an explicit reference (e.g., a pointer) can be included, or an implicit reference (e.g., a category, type, or association of the artifact) can be associated with a dynamic or predefined set of input data structures. For example, a transaction record for an automatic clearing house transaction can be assigned with a predefined set of input data structures containing data fields related thereto.

The request can be made with reference to one or more confidence thresholds. For example, the request can specify a numeric threshold, an offset threshold, or other thresholds. The confidence threshold can be configured to return matches (e.g., a data field or row having a relevant affiliation with an artifact, or having a highest match score). The confidence threshold can also be configured to return near matches. For example, a near match can have a lower confidence than a match, but may still be of interest. For example, a near match can have an actual affiliation which can be determined by manual inspection, or a near match can be a data field or row lacking a relevant affiliation with the artifact, but which may be of interest to a user. For example, it may be of interest to a user to identify an employee or contractor with a same or similar name (e.g., to avoid confusion such as inadvertently eliminating a current employee's credentials).

Referring to operation 420, a type of each of the input data structures is determined. For example, a data structure can be identified as a transaction list, an approvals list, an employee list, an applications listing, etc. The type of the input data structures can be determined according to a label, location, content of the input data structures, size of the input data structures, etc. For example, one or more of the input data structures can be provided with one or more metadata that identifies the input data structure as belonging to a type. The metadata can be a native element of the input data structure, or can be appended, such as by a form used to generate the request.

The input data structures can include predetermined data fields which can be detected according to the type of the input data structures. For example, a transaction log can include a transaction identifier, an employee list can include an employee name, and an application listing can include a user credential. The predetermined data fields can also be otherwise determined. For example, a predetermined data fields can be based on the content of the data field (e.g., the inclusion of an '@' once per field in all or most fields can indicate an email address data field.) The predetermined fields can also be based on a field type. For example, an integer field can be associated with an employee identifier, according to some embodiments.

The data processing system can tokenize one or more of the data fields into one or more sparse matrices. For example, the data fields of the first input data structure and of the one or more predetermined data fields of each of the other input data structures can be tokenized. The sparse matrices can include locations for each predetermined data field of each data structure, and can be populated according to a subset of present data fields for each data structure. For example, a sparse matrix can include a data field on each row for a user name of a terminated employee or a terminated contractor. One or more user names can correspond to a termination date. The sparse matrix can also include one or more active employees whose names may not correspond to a termination date (e.g., based on an artifact comprising one or more user names for one of a login or a user profile in one or more applications). The tokenization can include determining a count of one or more n-grams associated with each data field or row. For example, the tokenization can include a determination of n-grams that may be sparse (e.g., most fields may not contain most n-grams).

Referring to operation 430, one or more artifacts are compared to predefined data fields. For example, one or more artifacts may be received in a predefined data field. The predefined data field of the artifact can be based on an entry form, a data structure, or an inference based on the content of the data field. For example, the artifact may be an email address and may be received in a predetermined data field for an email address (e.g., a short text data field allowing one instance of the '@' character and zero instances of the ' § ' symbol). The artifacts can be compared to one or more additional data fields. For example, the artifacts can be compared to a row of data fields, or a subset of data fields of a row. For example, a first data field of a row can contain a name, a second data field of a row can contain an email address, and a third data field of a row can contain a Boolean value relating to an employee credential. In some embodiments, the name or the email is compared to the artifact and the Boolean value is not. In some embodiments, the exclusion may be explicit, based on a lack of anticipated relevant data of the data field. In some embodiments, the exclusion may be implicit (e.g., if a comparison relies on n-grams having a length of 3, a value of '0' or '1' can be excluded). In some embodiments, all data fields of a row are considered, which may, advantageously, simplify system implementation. For example, all data fields can be considered individually, or multiple data fields of a row can be concatenated for the comparison.

The comparison can be or include a fuzzy logic match based on a fuzzy logic algorithm performed on one or more of the sparse matrices to identify at least one match. A fuzzy logic algorithm can execute fuzzy comparisons between the content of various data fields. For example, the n-grams of the tokenized data fields can be matched according to a number of n-grams that can be weighted to a request, a table, a row, or a data field. A match score exceeding one or more thresholds can be determined based on a number of matching and non-matching n-grams. For example, a confidence of a fuzzy match can relate to matching all or some n-grams between fields. For example, identical fields can generate a same number of matches of a same number and type of n-grams.

Referring to operation 440, matched artifacts are identified. For example, matched artifacts can be identified with regard to a row or to a data field. The matches can be can be determined based on a match score. For example, the match score can relate to a weighted number of n-grams. For example, n-grams can be generated for each data field of a matrix. The matrix can be defined based on one or more input data structures. For example, the matrix can be sparse relative to the total number of fields in a match (e.g., a data input structure for employee identifiers may not include a transaction code). An occurrence frequency of a number of n-grams in a row or data field of the matrix can be weighed to determine a weight for each row (based on the number of n-grams in the row). For example, the artifact or the data input structure can have a number of n-grams or an occurrence frequency of n-grams associated therewith. A match score can be determined by comparing n-grams of the rows or data fields with the n-grams of the one or more artifacts. The match score can be compared to one or more thresholds. For example, a first threshold can indicate a match and a second threshold can indicate a near match. Any number of matches can be determined to be a match or a near match.

Referring to operation 450, an output file is generated. The output file may contain the matched artifact and one or more data fields matching the artifact (e.g., one or more data fields of a matching row). The output file can include additional information such as a match score, a ranked list of matches, a list of compared data (e.g., a number of records, a list of input data structure types, or a reference thereto). For example, the output file can include one or more copies of one or more records, such as the matches. The output file can contain data from various input fields and may thus be sparse as some rows have lack populated data fields for one or more columns.

Referring to operation 460, the output file is stored. For example, the output file can be stored at a local location or sent to a user (e.g., at a shared memory accessible to the user), such as a file system or email account. The output file can be transmitted through one or more interfaces. For example, a graphical user interface can present the one or more matches or near matches. The storage location can be a secure location (e.g., which requires user authentication). For example, the location can be a shared file location such as a shared directory or SFTP being accessible by at least one user and the data processing system. In some implementations or embodiments, the data processing system may not maintain access the storage location after causing the output file to be conveyed thereto. For example, a data processing system may lack edit or delete rights to a storage location such as a directory or an email application of a user. In some embodiments, the data processing system can identify a user based on the request (e.g., a request form can include an email address or other identifier of the user). The data processing system can thereafter transmit credentials to the user which can authenticate user access to the storage location. For example, the data processing system can convey a key, password, secure path, or otherwise provide the user with authenticatable access to the storage location. The secure location can include a user interface such as a GUI for the presentation of the one or more matches. The output file, or elements thereof, can be displayed on the interface to identify the one or more matches. The data processing system can receive one or more additional requests from a user. The additional requests can be responsive to the first request. For example, the first request can indicate a match and provide one or more additional associations with the match (e.g., an identity number, access credential or other associated data). The user can initiate a second request based on the second data. For example, the user interface can present one or more data fields for selection for further search as an artifact. In some embodiments, a first request for a name can return a matched or associated employee identifier. A subsequent request can return additional data associated with the employee identifier. In some embodiments, the additional data can be returned for the first request (e.g., according to threshold).

While the invention has been particularly shown and described with reference to specific embodiments, it should be understood by those skilled in the art that various changes in form and detail may be made therein without departing from the spirit and scope of the invention described in this disclosure.

Various descriptions, herein, make use of the word "or" to refer to plurality alternative options. Such references are intended to convey an inclusive or. For example, various data processing system 200 components herein are referred to as hardware or software components. Such a disclosure indicates that the components may comprise a hardware component, a software component, or both a hardware and software component.

What is claimed:

1. A method comprising:
   identifying, by a data processing system, one or more fields of a plurality of input data structures to be reconciled with one or more artifacts received via a user interface;
   generating, by the data processing system, a sparse matrix comprising n-grams for each of the one or more fields of the plurality of input data structures in a subset of fields of the sparse matrix;
   identifying, by the data processing system, a number of occurrences of n-grams for each of the one or more fields of the sparse matrix;
   comparing, by the data processing system, n-grams of each of the one or more fields of one or more of the plurality of input data structures with n-grams of each of the one or more artifacts;
   determining, by the data processing system responsive to the comparison, a match score for one or more matches, the match score based at least on a weight corresponding to the number of occurrences of n-grams in each of the one or more fields of the sparse matrix and a number of occurrences of n-grams in a row of the one or more fields of the sparse matrix; and
   providing, by the data processing system, an output file comprising at least one of the plurality of input data structures having the one or more matches and copies of the one or more artifacts having the match score of the one or more matches greater than a threshold, the provision comprising providing the match with the match score that is higher than others of the one or more match scores.

2. The method of claim 1, further comprising receiving, by the data processing system via the user interface, a request from the user interface by a user to reconcile the one or more artifacts across the plurality of input data structures.

3. The method of claim 1, further comprising receiving, by the data processing system via the user interface, the threshold to be applied to matches of the one or more fields with the one or more artifacts.

4. The method of claim 1, further comprising identifying, by the data processing system, a type of the plurality of input data structures and based at least on the type, identifying the one or more fields of the plurality of input data structures.

5. The method of claim 1, further comprising causing, by the data processing system, the output file to be stored in a storage location accessible by the user interface via authentication.

6. The method of claim 1, further comprising generating, by the data processing system, the sparse matrix, by tokenizing the one or more fields of the plurality of input data structures.

7. The method of claim 1, further comprising using, by the data processing system, a fuzzy logic algorithm to compare the n-grams of each of the one or more fields of one or more of the plurality of input data structures with the n-grams of each of the one or more artifacts.

8. A system comprising:
a data processing system configured on one or more processors, coupled to memory and to:
identify one or more fields of a plurality of input data structures to be reconciled with one or more artifacts received via a user interface;
generate a sparse matrix comprising n-grams for each of the one or more fields of the plurality of input data structures in a subset of fields of the sparse matrix;
identify a number of occurrences of n-grams for each of the one or more fields of the sparse matrix;
compare n-grams of each of the one or more fields of one or more of the plurality of input data structures with n-grams of each of the one or more artifacts;
determine, responsive to the comparison, a match score for one or more matches, the match score based at least on a weight corresponding to the number of occurrences of n-grams in each of the one or more fields of the sparse matrix and a number of occurrences of n-grams in a row of the one or more fields of the sparse matrix;
receiving, by the data processing system via the user interface, a threshold to be applied to matches of the one or more fields with the one or more artifacts; and
provide an output file comprising at least one of the plurality of input data structures having the one or more matches and copies of the one or more artifacts having the match score of the one or more matches greater than the threshold.

9. The system of claim 8, further comprising receiving, by the data processing system via the user interface, a request from the user interface by a user to reconcile the one or more artifacts across the plurality of input data structures.

10. The system of claim 8, further comprising identifying, by the data processing system, a type of the plurality of input data structures and based at least on the type, identifying the one or more fields of the plurality of input data structures.

11. The system of claim 8, further comprising causing, by the data processing system, the output file to be stored in a storage location accessible by the user interface via authentication.

12. The system of claim 8, further comprising generating, by the data processing system, the sparse matrix, by tokenizing the one or more fields of the plurality of input data structures.

13. The system of claim 8, further comprising using, by the data processing system, a fuzzy logic algorithm to compare the n-grams of each of the one or more fields of one or more of the plurality of input data structures with the n-grams of each of the one or more artifacts.

14. The system of claim 8, further comprising providing, by the data processing system, the match with the match score that is higher than others of the one or more match scores.

15. A system comprising:
a data processing system configured on one or more processors, coupled to memory and to:
receive a request to reconcile one or more artifacts across a plurality of input data structures within a confidence threshold;
compare, using at least a calculation of a number of occurrences of n-grams in a plurality of n-grams generated for each of one or more of a subset of data fields of a sparse matrix, a first one or more artifacts of one or more data fields of a first input data structure of the plurality of input data structures against a second one or more artifacts of the one or more data fields of each of others of the plurality of input data structures;
receive a confidence threshold to be applied to matches of the one or more data fields with the one or more artifacts;
determine, responsive to the comparison, a match score that at least meets the confidence threshold for one or more matches of the first one or more artifacts of the first input data structure with the second one or more artifacts of the others of the plurality of input data structures, wherein the match score is determined based on a weight corresponding to the number of occurrences of the n-grams in each of the one or more data fields of the sparse matrix and a number of occurrences of n-grams in a row of the one or more data fields of the sparse matrix; and
create an output file to include the first input data structure and a copy of the one or more matches of the second one or more artifacts from the others of the plurality of input data structures with a highest match score.

16. The system of claim 15, wherein the data processing system is configured to:
provide the match with the match score that is higher than other match scores.

17. The system of claim 15, wherein the data processing system is configured to:
use a fuzzy logic algorithm to compare the n-grams of each of the one or more data fields of one or more of the plurality of input data structures with the n-grams of each of the one or more artifacts.

18. The system of claim 15, wherein the data processing system is configured to create the output file based on a receipt of a request, from a user interface, to reconcile the one or more artifacts across the plurality of input data structures.

19. The system of claim 15, wherein the data processing system is configured to:
identify a type of the plurality of input data structures and based at least on the type, identifying the one or more data fields of the plurality of input data structures.

* * * * *